Patented Oct. 11, 1938

2,132,389

UNITED STATES PATENT OFFICE 2,132,389

PREPARATION OF AMINO BODIES

Johann A. Bertsch, St. Louis, Mo., assignor to Monsanto Chemical Company, St. Louis, Mo., a corporation of Delaware No Drawing. Application April 12, 1935, Serial No. 16,016

18 Claims. (Cl. 260—580)

This invention relates to the preparation of aryl and cyclical amines and it has particular relation to the preparation thereof by direct hydrogenation of nitrogen containing bodies in the presence of a hydrogenation catalyst.

The main objects of the invention are:

To provide a process of preparing aryl and cyclical amines by direct hydrogenation in which commercial nitrobenzenes containing substantial amounts of thiophenes and other catalyst poisons may be employed;

To provide novel methods of effecting contact between the catalyst and the nitro body;

To provide a process of preparing aromatic and cyclical amines in which the problem of disposal of the by-products of the reaction is eliminated or at least greatly facilitated;

To provide a process of the above indicated character which is simple and inexpensive to conduct and which results in exceptionally high yields of relatively pure product;

To provide a process in which relatively low temperatures and pressures may be employed to effect the hydrogenation.

These and other objects will be apparent from perusal of the appended specification.

In the commercial preparation of aniline, its homologues and the corresponding cyclical amines obtained by hydrogenation of the nucleus of aniline or its homologues, nitrobenzene or nuclear substituted nitrobenzene are usually employed as the primary or starting materials. The nitro group of these materials is subjected to reduction with hydrogen which, in ordinary commercial processes, is generated in the nascent state by employing iron along with a small amount of an acid (hydrochloric acid) in the liquid phase of the nitro body. This process of preparing aniline or aniline homologues is objectionable because the iron employed to liberate the nascent hydrogen remains as a slimy sludge or residue in the aniline product after the reduction and it must be removed by steam distilling off the aniline. Also, since aniline is prepared in enormous quantities a huge volume of this spent iron residue is obtained and its disposal constitutes a serious problem because if it is permitted to discharge into streams it constitutes a serious source of contamination.

Preparation of aniline and aniline homologues and the nuclear hydrogenated derivatives thereof by direct action of hydrogen gas in the presence of a catalyst of hydrogenation whereby use of iron is obviated, has often been suggested. However, such process has never found any commercial application, at least in the United States, because benzenes employed as the starting material for the preparation of nitrobenzene always contain at least minute traces (one or two-tenths of a per cent or even more) of thiophenes and other sulphur containing bodies. These bodies at these concentrations or even lower concentrations are such active poisons for all ordinary catalysts that commercial application of the process to the hydrogenation of nitrobenzene has heretofore been impossible.

The present invention is based upon the discovery that certain catalysts, obtained by hydrolysis of a nickel-alkaline earth metal or nickel-aluminum alloy to form a body consisting most probably of metallic nickel in intimate association with alkaline earth metal oxides or the hydrated forms thereof, constitute highly active catalysts for the liquid phase hydrogenation of nitrobenzene, nitrobenzene homologues and for the hydrogenation of the nuclei of these aromatic amines to form cyclical amines, and that these catalytic bodies are also highly resistant to the poisoning effect of thiophene or the other catalyst poisons present in commercial grades of nitro bodies. The catalysts are also highly satisfactory for the further hydrogenation under higher temperatures and pressures of the resulting amino bodies to form hydrogenated or cyclical amines of the type of cyclohexylamine and its homologues. Also, the process is quite satisfactory for the reduction of cyclohexylaniline to dicyclohexylamine or for conversion of cyclohexylamine into dicyclohexylamine through elimination of ammonia.

A suitable catalyst for use in the process may be obtained by hydrolyzing an alloy of nickel with aluminum or an alkaline earth metal, such as magnesium or calcium, the ratio of the nickel to the alkaline earth being of the order of 33 parts of nickel to 66 parts of the alkaline earth. This alloy is readily hydrolyzed by immersion in water or by exposure to the action of water vapors. The reaction is exothermic and hydrogen is evolved, and the cessation of the evolution of hydrogen constitutes an indication of the completion of the hydrolysis. It will be appreciated that the nickel-alkaline earth metal alloy preferably is in a fine state of subdivision and may be so obtained by crushing the alloy or by employing shavings, chips or filings. Fragments of a size of the order of rice grains or wheat grains have been found to be quite satisfactory for the purpose. Where water is employed to effect the hydrolyzation the surplus may be removed after completion of the reaction by decantation or filtration. In case the product is of slimy consistency and difficult to filter, the operation may be expedited by the use of a small amount of aqueous caustic soda. The residue should be preserved under water. The catalytic mass may be used by itself or it may be admixed with silica or other substances of catalytic or non-catalytic nature.

In the reduction of nitrobenzene or its homologues to form aniline or aniline homologues according to the present invention, the nitro body which may be of commercial grade and may be prepared from a benzene containing such quantities of catalyst poisons as to render it absolutely unfit for direct hydrogenation by ordinary methods, may be employed by itself or it may be admixed with a suitable solvent such as benzene, cyclohexane or aniline. It will be appreciated that the benzene itself at high temperatures and under high pressures is subject to hydrogenation but at the temperatures and pressures employed to hydrogenate the nitro bodies little difficulty is experienced because of this characteristic. The ratio of the nitro body (i. e. nitrobenzene) to solvent may vary over a considerable range but for practical purposes a solution of 10% to 20% of the nitro body in the solvent is found to be satisfactory. The catalyst may also be employed in various ratios but a proportion of approximately 2% by weight of the nitrobenzene content has been found by experience to be satisfactory. Of course, higher ratios of catalyst than this may be employed but the higher ratios do not produce a corresponding improvement in result and are therefore unnecessary. Materially lower ratios result in progressively decreasing speed of reaction. However, it is difficult to say at precisely what proportion the catalyst becomes ineffective. Probably the value will depend upon the time which is admissible for effecting the hydrogenation.

The reduction, of course, is effected in an autoclave or equivalent container which is equipped with suitable means for agitation. Since this apparatus is conventional, detailed description thereof is not deemed necessary. The primary ingredients (nitro body and catalyst) are charged into the autoclave and the latter is closed, after which the temperature is raised to approximately 80° C., more or less, and the flow of hydrogen is started. The pressure of hydrogen may vary over a relatively wide range but values of the order of 6 to 25 atmospheres have been found to be satisfactory. These values, of course, are merely given as typical examples and higher or lower pressures may be employed if desired. During the course of the reaction the temperature is gradually raised to approximately 135° C. The speed of the reaction may be controlled by increasing or decreasing the degree of agitation. However, under normal conditions the reaction will be found to have reached substantial completion after a period of approximately three and a half hours. The yield obtained will approximate 98% or above based upon the quality of nitrobenzene or its homologue employed in the reaction.

A convenient method of conducting the reaction is to partially fill the autoclave (say, one-third full) with aniline and then slowly to feed in nitrobenzene as the reduction to aniline progresses. Unduly violent reaction is thus inhibited.

The operation may be conducted, if desired, as a continuous operation by employing a plurality of reaction containers and permitting the nitro body to flow continuously or at frequent intervals into the first of these, and permitting the partially hydrogenated body to flow from the first container into the next and so on through the series until the hydrogenation in the final container is substantially complete. It, of course, will be appreciated that in this type of process a relatively low temperature (approximately 80° C.) is employed in the first container and the temperature is progressively raised in the remaining containers.

In either of the processes as thus described, the separation of the catalyst from the reaction product may be effected by simple decantation or, if desired, by simple fractionation. It will be appreciated that the catalyst is comparatively insusceptible to the action of the ordinary poisons but for purposes of continuously maintaining the activity and the quantity thereof it is desirable to introduce from time to time small amounts of fresh catalyst and if necessary to remove a corresponding amount of the used material. Preferably, approximately one-tenth of the catalyst is removed after the reduction of each batch. Of course, an amount sufficient to make up for the loss and to maintain the quantity of catalyst substantially constant is added to replace the removed material.

Where the continuous process is employed it is possible to restrain the movement of the catalyst in the liquid by filters or screens and to advance it periodically from the reaction chambers where reaction is nearing completion to the vessels where reaction is less advanced. By thus proceeding, the most nearly completely hydrogenated nitro body contacts with the freshest and most active catalyst, thus insuring that the maximum degree of hydrogenation is attained. At the same time, the less active catalyst contacts with the fresher nitro body and tends preliminarily to remove poisons and further to conserve the fresher catalyst.

Another variation of the process involves the trickling of the nitrobenzene containing fluid continuously downwardly in a column packed with catalytic material or with a mixture of catalyst and another fragmentary material which serves further to increase the surface exposed to hydrogenation and the time of exposure or, if desired, the catalyst may be supported upon suitable baffles or other structural barrier within the container. It will be appreciated that during the downward flow of the nitro body hydrogen or hydrogen containing gas is continuously passed upwardly through the mass by countercurrent flow.

The reduced body as thus obtained, of course, is admixed with the water of reaction resulting from the reduction of the nitro groups and may contain a small amount of resinous residue. These substances may be eliminated by distilling the reaction product in conventional manner.

At temperatures of approximately 180° C. and at pressures of about 500 pounds per square inch the hydrogenation of the nucleus of the benzene body becomes appreciable, producing cyclohexylamine which condenses partly with itself or with aniline to form the dicyclohexylamine or cyclohexylaniline. At the above temperatures the proportions of these ingredients will usually be within the range of 2%–6%, based upon the total amount of the hydrogenated body.

Cyclohexylamine may be converted into cyclohexylaniline and dicyclohexylamine to the extent of 65%–80% if the reaction temperature is raised to 230° C. and above.

The temperature of the reaction may be raised to approximately 245° C. or above, but preferably not higher than approximately 270° C. In no event should the temperature be so high as to cause excessive formation of tars and other decomposition products. There is a gradual increase in the amount of cyclohexylamine and cyclohexylaniline as the temperature goes up. At temperatures of the above order the amount of these products will equal approximately 45% of the total hydrogenated product.

If nuclear hydrogenated products are desired it is preferable to eliminate the water after the hydrogenation of the nitro group, for example by subjecting the material to a simple distillation. At about 93°–95° C. water, with some steam volatile substances, distills off. If the water is permitted to remain it, of course, has its partial vapor pressure at the temperatures employed to effect the reaction and it acts as a diluent for the hydrogen and thus tends to slow up the reaction.

This distillation is readily effected by merely "cracking" the valves of the autoclave at the conclusion of the step of reducing the nitro body and allowing the water to escape as steam. Any aniline passing over is recovered by conventional methods. It may be stated that separation and purification of aniline from any residues and by-products prior to ring hydrogenation is not required. The aniline may be left in the autoclave in which reduction is effected and the hydrogen pressure and the temperature raised to the required value.

If homologues of aniline are to be prepared, the nitrated homologue of benzene, of course, is employed as the primary material and the reaction is conducted substantially as above described. In this manner toluidine and xylidine may be prepared from toluene or xylene. These homologues of aniline may also be hydrogenated in the nucleus to produce homologues of cyclohexylamine.

The course of the various reactions involved in the process constituting the subject matter of this invention may be represented graphically by the following equations:

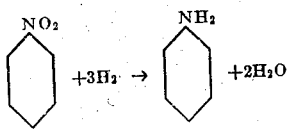

Temperature 85°–125° C. Pressure 100 lbs. per square inch or above.

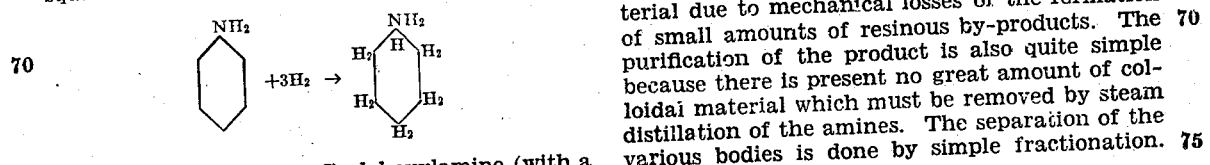

Aniline at 180°–210° C. Cyclohexylamine (with a few percent dicyclohexylamine). Pressure about 500 lbs. or above.

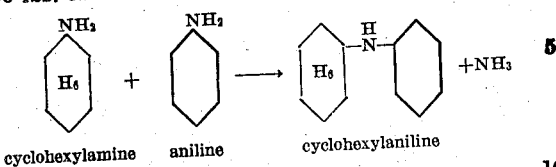

Temperature greater than 215° C.

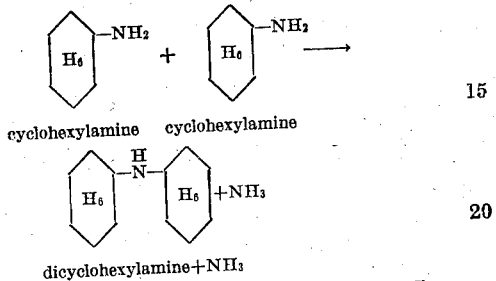

Temperature 215° C. and up to about 270° C.

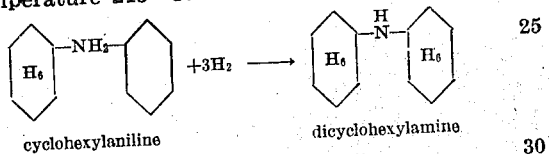

Temperature range 225° C. to 270° C.

The hydrogenation of cyclohexylaniline is favored if the cyclohexylamine and the aniline are distilled off prior to initiation of the conditions (high temperature and pressure) at which formation of this compound is most active. This distillation is easily effected by simply "cracking" the autoclave valve.

It is not implied that only the reactions given by the equations occur at the temperatures but at these values the particular reaction occurs at approximately maximum relative rate.

The formation of cyclohexylaniline and dicyclohexylamine in the preparation of aniline or its homologues may be greatly reduced or substantially eliminated by admixing a small amount (say 10%–20%) of these bodies obtained from prior runs into the nitro body or amino compound prior to the initiation of the benzene ring hydrogenation operation.

The catalyst employed in the foregoing reactions is relatively simple and inexpensive to prepare and it will be apparent that it may be used to hydrogenate a relatively large amount of nitrobenzene or homologue thereof before it loses its catalytic activity; in fact, a given amount of catalyst will hydrogenate approximately 400 or 500 times its weight of the nitro body before it is replaced. Of course, the nickel contained in this body may be salvaged by any convenient method. However, even if it is not preserved the loss is not very great. It will also be apparent that the amount of spent catalyst is relatively small and the disposal thereof, even if the nickel is not salvaged, does not constitute a material problem. The proportion of the nitro body converted into amines is relatively large and therefore there is but slight loss of the primary material due to mechanical losses or the formation of small amounts of resinous by-products. The purification of the product is also quite simple because there is present no great amount of colloidal material which must be removed by steam distillation of the amines. The separation of the various bodies is done by simple fractionation.

For these reasons it will be apparent that the process involved in the present invention is highly desirable from a commercial viewpoint.

Although only the preferred embodiments of the invention have been shown and described it will be apparent to those skilled in the art that these forms are given merely by way of illustration and that numerous modifications may be made therein without departure from the spirit of the invention or from the scope of the appended claims.

What I claim is:

1. A method of hydrogenating a nitrobenzene containing catalyst poisons consisting of sulfur compounds which comprises subjecting it in liquid phase to contact with hydrogen gas and in the presence of a catalyst obtained by hydrolyzing a nickel-alkaline earth metal alloy.

2. A method of preparing aryl amines of the benzine series which comprises hydrogenating an aryl nitro body of the benzene series in liquid phase with hydrogen and in the presence of a catalyst obtained by the hydrolysis of a nickel-alkaline earth metal alloy.

3. A method of preparing aniline which comprises subjecting nitrobenzene in liquid phase, containing sulfur catalyst poisons, to hydrogenation with gaseous hydrogen in the presence of a catalyst obtained by the hydrolysis of a nickel-alkaline earth metal alloy.

4. A method of preparing aryl amines of the benzene series, which comprises subjecting an aryl nitro body, containing a single benzene nucleus, to hydrogenation while in liquid phase in the presence of a hydrogenation catalyst obtained by hydrolysis of a nickel-alkaline earth metal alloy, a small amount of the catalyst being replaced after each hydrogenation by a corresponding amount of fresh catalyst.

5. A method as defined in claim 4 in which the nitro body is nitrobenzene.

6. A method as defined in claim 4 in which the nitro body is nitrotoluene.

7. A method of hydrogenating nitrated aryl hydrocarbons of the benzene series which comprises causing them to contact in liquid phase with a catalyst consisting essentially of a hydrolyzed nickel-alkaline earth metal alloy, until the nitro group is reduced, then raising the temperature of reaction and continuing hydrogenation to effect hydrogenation of the aryl nucleus.

8. A method as defined in claim 7 in which the first stage of the hydrogenation is effected at a temperature below 180° C. and above approximately 80° C., and the second stage is conducted at a temperature above 180° C. but below that at which pyrolytic decomposition of the organic materials present occurs.

9. A method as defined in claim 7 in which the hydrogenation of the nuceus of the amine is effected without preliminary purification after the reducing stage.

10. A method of preparing dicyclohexylamine which comprises hydrogenating the aniline to form a mixture of cyclohexylamine, aniline and cyclohexyaniline, distilling off the aniline and cyclohexylamine, then hydrogenating cyclohexylaniline.

11. A method as defined in claim 10 in which the hydrogenation is effected in the presence of a catalyst consisting essentially of a product obtained by hydrolysis of a nickel-alkaline earth metal alloy.

12. A method as defined in claim 10 in which the hydrogenation is effected in the presence of a catalyst consisting essentially of a product obtained by hydrolysis of an alloy of nickel, said alloy consisting essentially of nickel and a metal selected from a group consisting of magnesium, aluminum and the alkaline earth metals.

13. A method of preparing aniline which comprises subjecting liquid nitrobenzene to hydrogenation at a reactive temperature and pressure in the presence of a catalyst obtained oy hydrolyzing an alloy of nickel, said alloy consisting essentially of nickel and a metal selected from a group consisting of magnesium, aluminum and the alkaline earth metals.

14. A method as defined in claim 13 in which the catalyst amounts to about 2% based upon the weight of nitrobenzene.

15. The improved method of nuclear hydrogenation, characterized in that an aryl amine of the benzene series is subjected to the action of elemental hydrogen at reaction temperatures and pressures in the presence of a nickel catalyst obtained by hydrolysis of a nickel-alkaline earth metal alloy.

16. The improved method of nuclear hydrogenation characterized in that nitrobenzene is subjected to the action of elemental hydrogen at reaction temperature and pressure in the presence of a nickel catalyst obtained by hydrolysis of a nickel-alkaline earth metal alloy.

17. The improved method of nuclear hydrogenation, characterized in that an aryl amine of the benzene series is subjected to the action of elemental hydrogen at reaction temperatures and pressures in the presence of a nickel catalyst obtained by hydrolysis of an alloy of nickel, said alloy consisting essentially of nickel and a metal selected from a group consisting of magnesium, aluminum and the alkaline earth metals.

18. A method of preparing aryl amines of the benzene series which comprises hydrogenating an aryl nitro body of the benzene series in liquid phase with hydrogen and in the presence of a catalyst obtained by the hydrolysis of an alloy of nickel, said alloy consisting essentially of nickel and a metal selected from a group consisting of magnesium, aluminum and the alkaline earth metals.

JOHANN A. BERTSCH.